(12) United States Patent
Hajjar

(10) Patent No.: US 8,493,284 B2
(45) Date of Patent: Jul. 23, 2013

(54) COMPOSITE SCREENS FORMED BY TILED LIGHT-EMITTING SCREENS

(75) Inventor: Roger A. Hajjar, San Jose, CA (US)

(73) Assignee: Prysm, Inc., San Jose, CA (US)

( * ) Notice: Subject to any disclaimer, the term of this patent is extended or adjusted under 35 U.S.C. 154(b) by 979 days.

(21) Appl. No.: 12/425,357

(22) Filed: Apr. 16, 2009

(65) Prior Publication Data
US 2010/0265160 A1    Oct. 21, 2010

(51) Int. Cl.
*G09G 5/00* (2006.01)

(52) U.S. Cl.
USPC ............................................ 345/1.3; 345/1.1

(58) Field of Classification Search
USPC ............... 345/1.3, 1.1, 1.2, 4, 9, 76, 204, 77, 345/102; 250/458.1
See application file for complete search history.

(56) References Cited

U.S. PATENT DOCUMENTS

| | | | |
|---|---|---|---|
| 5,805,117 A * | 9/1998 | Mazurek et al. | 345/1.3 |
| 6,611,241 B1 * | 8/2003 | Firester et al. | 345/1.3 |
| 7,358,929 B2 * | 4/2008 | Mueller et al. | 345/1.3 |
| 7,688,335 B2 * | 3/2010 | Brown Elliott et al. | 345/613 |
| 7,719,480 B2 * | 5/2010 | Devos et al. | 345/1.3 |
| 2005/0093768 A1 * | 5/2005 | Devos et al. | 345/1.3 |
| 2007/0187616 A1 * | 8/2007 | Burroughs et al. | 250/458.1 |
| 2008/0291140 A1 | 11/2008 | Kent et al. | |

FOREIGN PATENT DOCUMENTS

| | | |
|---|---|---|
| CN | 1192574 | 9/1998 |
| WO | WO 2007/050662 A2 | 5/2007 |
| WO | WO 2007/095329 A2 | 8/2007 |
| WO | WO 2007/131195 A2 | 11/2007 |
| WO | WO 2007/134329 A2 | 11/2007 |

OTHER PUBLICATIONS

First Office Action English summary only received for Chinese Patent Application No. 201010152200.0, dated Jun. 4, 2012 (4 pages).
Second Office Action and English summary received for Chinese Patent Application No. 201010152200.0, dated Nov. 20, 2012 (13 pages).

* cited by examiner

*Primary Examiner* — Dmitriy Bolotin
(74) *Attorney, Agent, or Firm* — Fish & Richardson P.C.

(57) ABSTRACT

Techniques and display devices that provide a composite display screen made up by placing multiple smaller constituent screens based on a light-emitting screen technology to minimize the gap between two adjacent constituent screens.

25 Claims, 7 Drawing Sheets

COMPOSITE SCREENS FORMED BY TILED LIGHT-EMITTING SCREENS

BACKGROUND

This patent document relates to display screens, display device and systems.

Large display screens are desirable in various applications. Due to various limitations in screen technologies, instead of making a large display screen from a single display screen, multiple small display screens can be tiled in an array to form a large display screen. Examples for such display screens formed by smaller screens include a video wall where multiple TV sets are stacked in a two-dimensional array. When displaying a large image on the multiple tiled TV sets, each TV set is controlled to display a portion of the full image and different portions of the full images are displayed by different TV sets.

In a scanning-beam display system, one or more optical beams can be scanned over a screen to form images on the screen. The one or more scanning optical beams can be laser beams generated from lasers to provide sufficient optical power to achieve a desired display brightness on the screen. In some implementations of such a display system, the screen may be a passive screen that does not emit light and uses the light of the one or more scanning optical beams to form the images by reflecting, diffusing or scattering the light of the one or more scanning optical beams. In other implementations, the screen of such a display system may have light-emitting materials that absorb the light of the one or more scanning optical beams and emit new light that forms the images and the light of the one or more scanning optical beams is not directly used in forming the images seen by a viewer.

The beam scanning in various scanning-beam display systems can be achieved by, e.g., using one or more beam scanners. Some laser display systems use a polygon scanner with multiple reflective facets to provide horizontal scanning and a vertical scanning mirror such as a galvo-driven mirror to provide vertical scanning. In operation, one facet of the polygon scanner scans one horizontal line as the polygon scanner spins to change the orientation and position of the facet and the next facet scans the next horizontal line. The horizontal scanning and the vertical scanning are synchronized to each other to project images on the screen.

SUMMARY

This document describes, among others, examples and implementations of techniques and display devices that provide a composite display screen made up by placing multiple smaller constituent screens based on a light-emitting screen technology to have a substantially seamless transition between two adjacent constituent screens, independent of the orientations of the screens to each other.

In one aspect, a display device is provided to include a composite display screen comprising a plurality of constituent display screens positioned next to one another where two adjacent constituent display screens interface each other along a common border. Each constituent display screen includes an active image-display area that includes parallel light-emitting stripes which absorb light of the one or more scanning optical beams to emit visible light to produce images carried by the one or more scanning optical beams and extend substantially to each edge of the constituent display screen to have a distance between an edge of an edge light-emitting region of one constituent display screen to an edge of an edge light-emitting region of an adjacent constituent display screen at a border between the two constituent display screens to be comparable to or less than a dimension of an image pixel. The two adjacent constituent display screens are oriented to each other to have parallel light-emitting stripes of one constituent display screen to be parallel to parallel light-emitting stripes of the other constituent display screen.

In another aspect, a display device is provided to include a composite screen including two or more constituent display screens placed adjacent to one another to form a composite display surface having substantially spatially uniform pixel regions in each location of the composite display surface. A border between two adjacent and interfacing edges of two adjacent constituent display screens is less in width than a dimension of one pixel region. Each constituent display screen includes light-emitting materials that form the pixel regions and emit visible light with a substantial spatial uniformity over a solid angle of greater than 70 degrees to display images, and structured to have a ratio of between any two gaps of any of the constituent screen formed with one or more adjacent constituent screens to be less than 1.3.

In yet another aspect, a display device is provided to include constituent display screens placed adjacent to one another to form a substantially contiguous display surface of substantially spatially uniform light-emitting pixels including a border between two adjacent constituent display screens when each constituent display screen is energized by excitation energy to display images. Each constituent display screen includes a front screen layer, a back screen layer and a light-emitting layer of light-emitting materials, located between the front and back screen layers, that receive the excitation energy through the back screen layer to emit visible light through the front screen layer forming the displayed images. A mechanism that applied the excitation energy to penetrate through the back screen layer without passing through any peripheral area around the constituent display screen. The light-emitting materials emit the visible light with a substantial spatial uniformity over a solid angle of greater than 70 degrees.

These and other features and implementations are described in detail in the drawings, the detailed description and the claims.

DETAILED DESCRIPTION

Figure 1A:
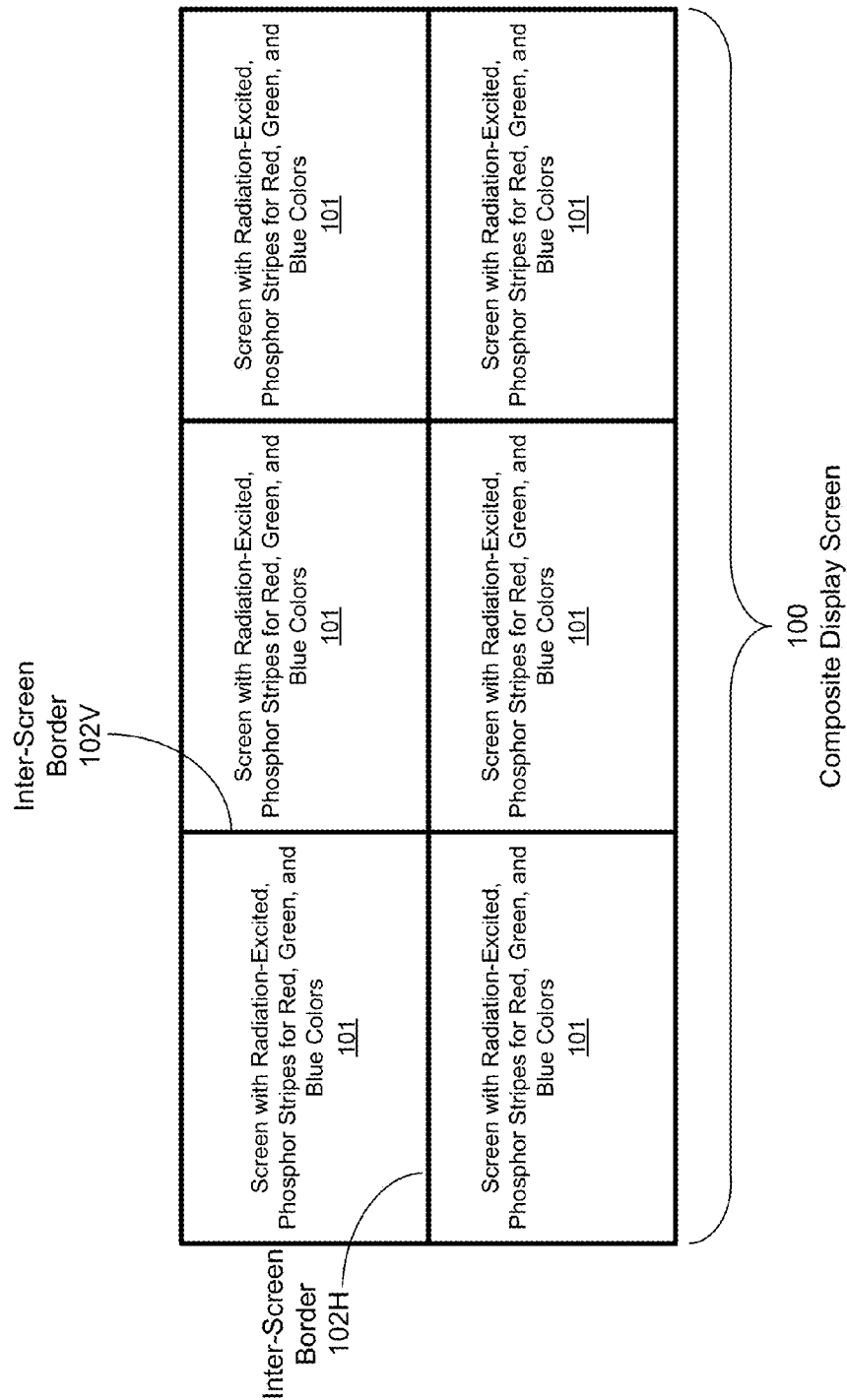
FIGS. 1A, 1B, 2A and 2B show an example of a display system having a composite display screen formed by multiple constituent light-emitting screens.

Many display screens have a frame or bezel of a certain width surrounding the image-displaying area. The image-displaying area effectuate image pixel regions or image pixel elements that each produce imaging elements of an image and collectively produce the full image. In a color display, each image pixel region or image pixel element on the screen is a fundamental color imaging unit and may include, in some implementations, three sub-pixel elements that produce three different colors, respectively. Each image pixel region or image pixel element outputs light for forming images in one or more active imaging locations within the area occupied by the image pixel region or image pixel element and includes one or more locations that do not output light and thus are non-imaging locations, e.g., an outer perimeter region of the image pixel region or image pixel element. The bezel that surrounds the image-display area does not output light that forms images and at least one side of the bezel of various displays is occupied by electronics for operating the display.

A composite display screen can be formed by tiling such display screens with bezels adjacent to one another to form a large display area. The bezels and space between interfacing edges of bezels of two adjacent and interfacing constituent display screens form a gap or border between and common to the two adjacent constituent screens and such a gap or border does not produce images. The space between interfacing edges of bezels of the two adjacent and interfacing constituent display screens can include an air gap due to imperfect contact between the edges of the two screens or presence of a material on the edge surface of each screen. When the gap or border has a width that is significantly greater than the dimension of image pixels of the constituent display screens, the gap or border can appear as inter-screen discontinuities and in some systems as dark grid lines on the images displayed by the composite display screen that visibly separate one constituent display screen from the other adjacent constituent display screens. Such inter-screen discontinuities or dark grid lines between adjacent constituent display screens degrade the display image quality of the large composite display screen and the appearance of the image degradation can become especially pronounced when each constituent display screen is a high-definition screen displaying high-definition motion or still images.

Examples and implementations of techniques and display systems described in this document use a light-emitting screen technology to form images by light emitted by the screen caused by energy applied to the screen through a back plane of the screen without going through an edge of the screen and to bring the active image displaying areas or pixels to the edge of a screen and provide a composite screen by tiling such light-emitting screens in an array with an inter-screen gap to be comparable to or less than the image pixel size. As a result, the border between two adjacent constituent screens, as perceived by a viewer, is essentially the same as the non-imaging regions between adjacent image pixels of each constituent display screen and is practically imperceptible to a viewer when the composite screen is operated to show images. Therefore, in the perception of a viewer, the imaging pixels of the composite display screen have a substantially or nearly spatially uniform appearance without a perceptible spatial discontinuity or separation at a border between two adjacent constituent screens.

Figure 1B:
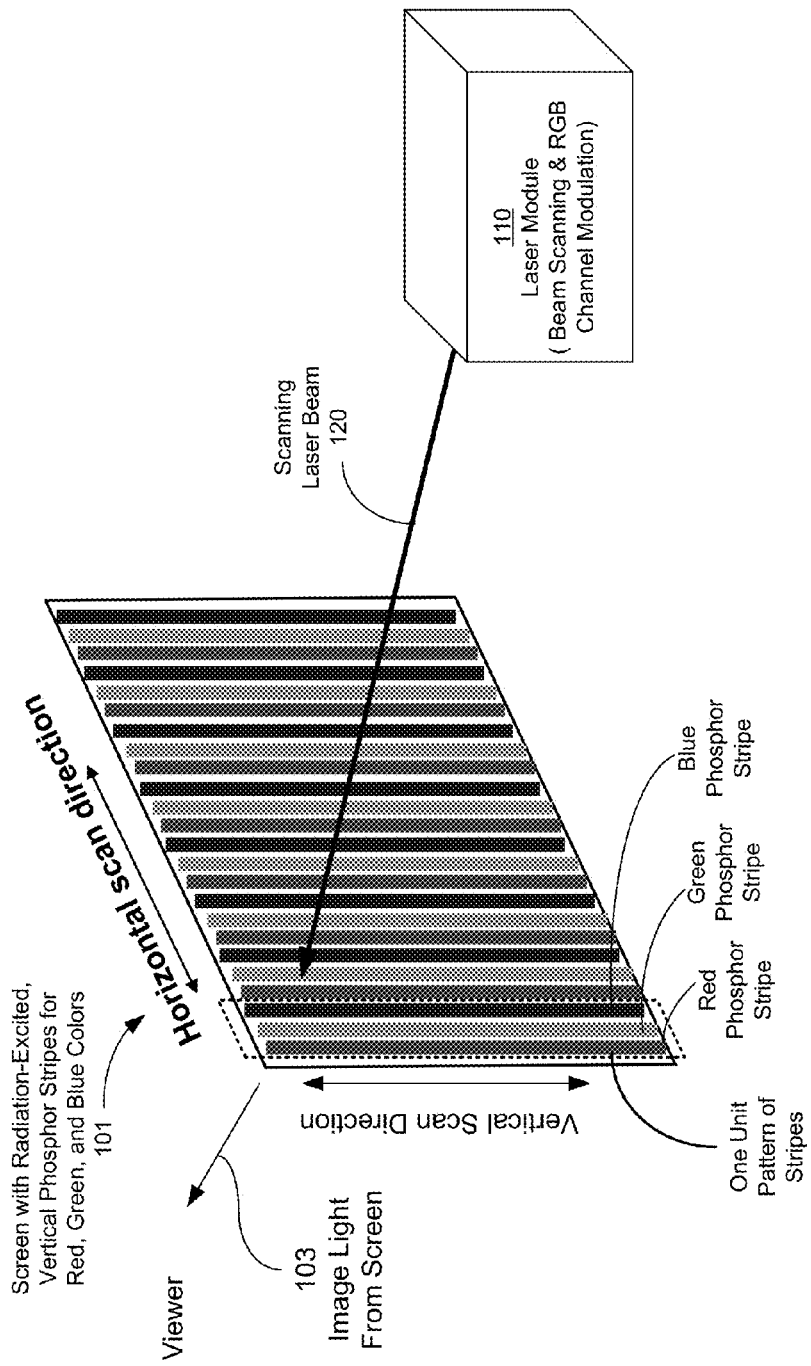

FIGS. 1A and 1B show an example of a display system with a composite display screen 100 formed by multiple constituent display screens 101 placed next to one another in an array. Each constituent screen 101 is a light-emitting screen that emits visible light in colors by converting excitation energy applied to the screen into the emitted visible light, e.g., via absorption of excitation light. The emitted visible light forms the images to a viewer. The screen 101 includes multiple screen layers, one or more of which have light-emitting components that convert the excitation energy into the emitted visible light that forms the images. Two adjacent constituent screens 101 butt against each other and are separated by an inter-screen border or gap (102H or 102V) that does not display images. As illustrated, an inter-screen gap along the vertical direction of the composite display screen 100 is a vertical gap 102V and an inter-screen gap along the horizontal direction of the screen is a horizontal gap 102H. In this example, each constituent screen 101 has straight edges and thus the inter-screen borders 102V and 102H are straight. In other implementations of the light-emitting screens, the constituent screens 101 may have curved edges that lead to curved inter-screen gaps 102V or 102H. In implementations, the widths of the inter-screen gaps 102H and 102V are configured to be comparable to or less than the display pixel size and thus become imperceptible to a viewer when the composite screen is operated to show images to eliminate the tiled appearance with visible dark grid lines in the displayed image in other composite display technologies.

Notably, the excitation energy applied to the constituent screen 101 to cause the emission of the visible light that forms the images is directed to the screen 101 via the rear surface of the screen 101 to penetrate through one or more screen layers to reach the light-emitting components that convert the excitation energy into the emitted visible light. As such, each screen 101 does not need a peripheral area of an edge of the screen 101 for placing edge electronics or other components to deliver the excitation energy to the light-emitting components of the screen 101. The excitation energy can be in various forms, e.g., electrical energy applied by an electrical circuit and optical energy applied by an optical module that directs light of the optical excitation energy to the screen. Under this mode of directing the excitation energy to the light-emitting components, the bezel region of the screen 101 can either be eliminated by placing the light-emitting components to the edge of the screen 101 or be designed to be on the order of the dimension of the image pixel to accommodate for a "borderless" transition from one screen to the other when the composite screen is operated to show images.

The examples provided in this document use optical energy as the excitation energy in form of one or more excitation beams to optically excite the light-emitting components in the screen 101 which has parallel light-emitting stripes separated by non-light-emitting lines located between the light-emitting stripes. Each light-emitting stripe can include a light-emitting material such as a phosphor-containing material that either forms a contiguous stripe line or is distributed in separated regions along the stripe. The one or more excitation beams are directed to one or more screen layers that are transparent to light of the one or more excitation beams and are controlled to optically address separate light-emitting regions in the light-emitting stripes. Under this design, each edge of the screen 101 is clear of any imaging control elements. Such an edge can be maintained along the entire perimeter of the screen 101 and can be used to support the light-emitting material if needed or left with a non-light emitting edge zone for proper spacing with the light-emitting material in another adjacent screen 101 to maintain a spatial continuity of light-emitting regions across a border of the two adjacent screens 101. With the light-emitting regions extending to or close to the screen edge at any edge of the screen 101, the distance between any screen edge light-emitting region and its closest display edge can be very small and essentially the same at any point along the screen perimeter.

In implementations, the optics and electronics for directing the one or more excitation beams to the screen 101 can be placed behind the screen 101 and confined within all boundaries of the screen 101 to facilitate tiling of such a screen with other screens.

FIG. 1B shows the apparatus associated with each constituent light-emitting display screen 101 in FIG. 1A in a rear-excitation configuration where the light source and a viewer on two opposite sides of the display screen 101, i.e., the rear side and the front side, respectively. A light module 110 is provided for the screen 101 and produces one or more scanning optical beams 120 that are scanned along two different directions, e.g., the horizontal direction and the vertical direction, in a raster scanning pattern on the screen 101. The light module 110 is located behind the screen 110 and, in the illustrated example, has a dimension within the perimeter of the screen 101. A beam scanning mechanism inside the light module 110 scans a beam 120 horizontally and vertically to render one image frame at a time on the screen 101. The light module 110 also includes a signal modulation mechanism to modulate each beam 120 to carry the information for image channels for red, green and blue colors. The screen 101 receives the light of the one or more scanning optical beams 120 on one side of the screen 101 and outputs image light 103 on the other side (i.e., the viewer side) of the screen 101. The light module 110 can be a laser module that has one or more lasers that produce laser light forming the one or more scanning optical beams 120 that optically excite light-emitting screen 101. The screen 101 includes light-emitting materials or fluorescent materials to emit new light under optical excitation of received light of one or more scanning optical beams 120 to produce the visible image light 103 towards the viewer. Under this design, the image light 103 is emitted by the light-emitting materials or fluorescent materials of the screen 101 at wavelengths different from that of the light of one or more scanning optical beams 120. The light-emitting materials on the screen 101 can be arranged to form light-emitting image pixels by distributing the light-emitting materials in separated areas on the screen and each separated area can be used as one light-emitting image pixel or two or more adjacent light-emitting pixels.

In the example in FIG. 1B, the light-emitting materials are formed on the screen 101 as parallel color phosphor stripes in the vertical direction and two adjacent phosphor stripes are made of different phosphor materials that emit light in different colors. For example, red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1B as red, green and blue. Other color sequences may also be used. The laser beam 120 is at the wavelength within the optical absorption bandwidth of the color phosphors and is usually at a wavelength shorter than the visible blue and the green and red colors for the color images. As an example, the color phosphors may be phosphors that absorb UV light to produce desired red, green and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to cause the beam 120 to be modulated to carry the information for image channels for red, green and blue colors. Examples of implementations of various features, modules and components in the scanning laser display system in FIG. 1B are described in U.S. patent application Ser. No. 10/578,038 entitled "Display Systems and Devices Having Screens With Optical Fluorescent Materials" and filed on May 2, 2006 (U.S. Patent Publication No. US 2008/0291140A1), PCT Patent Application No. PCT/US2007/004004 entitled "Servo-Assisted Scanning Beam Display Systems Using Fluorescent Screens" and filed on Feb. 15, 2007 (PCT Publication No. WO 2007/095329), PCT Patent Application No. PCT/US2007/068286 entitled "Phosphor Compositions For Scanning Beam Displays" and filed on May 4, 2007 (PCT Publication No. WO 2007/131195), PCT Patent Application No. PCT/US2007/68989 entitled "Multilayered Fluorescent Screens for Scanning Beam Display Systems" and filed on May 15, 2007 (PCT Publication No. WO 2007/134329), and PCT Patent Application No. PCT/US2006/041584 entitled "Optical Designs for Scanning Beam Display Systems Using Fluorescent Screens" and filed on Oct. 25, 2006 (PCT Publication No. WO 2007/050662). The disclosures of the above-referenced patent applications are incorporated by reference in their entirety as part of the disclosure of this document.

Figure 2A:
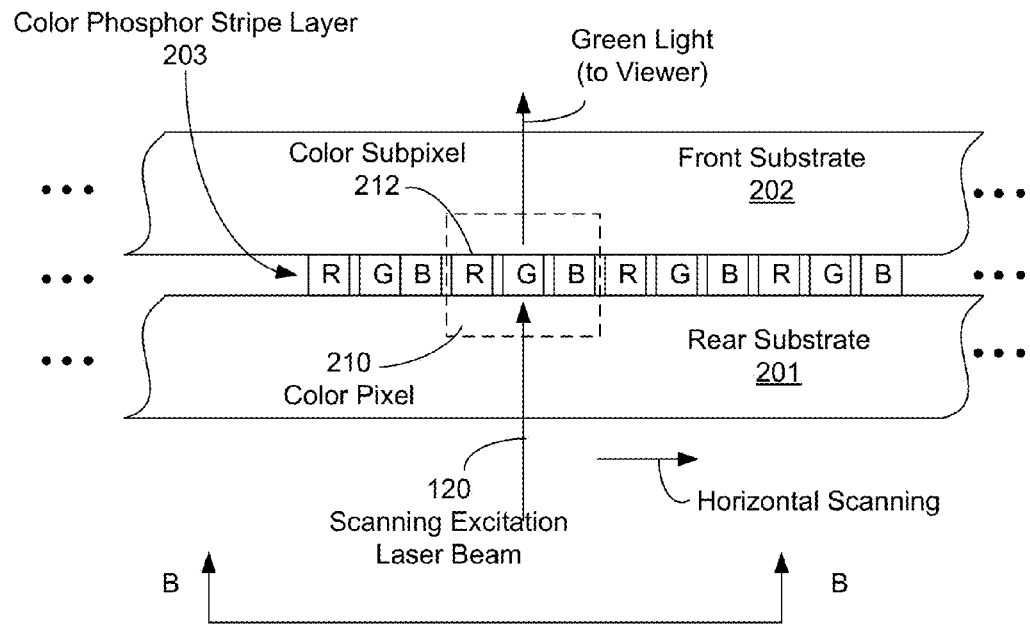

FIG. 2A shows an exemplary design of the screen 101 in FIG. 1B. The screen 101 includes a rear substrate 201 which is transparent to the scanning laser beam 120 and faces the laser module 110 to receive the scanning laser beam 120. A second front substrate 202, is fixed relative to the rear substrate 201 and faces the viewer in a rear scanning configuration. A color phosphor stripe layer 203 is placed between the substrates 201 and 202 and includes phosphor stripes. The color phosphor stripes for emitting red, green and blue colors are represented by "R", "G" and "B," respectively. The phosphor stripes can be used to emit visible light of a substantially uniform angular distribution of the optical intensity over a solid angle from the normal direction. The solid angle can be at or greater than 70 degrees in some implementations. The phosphors stripes are placed close to the surface of the screen so that the edge of the screen has a minimal effect on the angular distribution of light emitted by the edge pixels. The front substrate 202 is transparent to the red, green and blue colors emitted by the phosphor stripes. The substrates 201 and 202 may be made of various materials, including glass or plastic panels. The rear substrate 201 can be a thin film layer and is configured to recycle the visible energy toward the viewer. Each color pixel includes portions of three adjacent color phosphor stripes in the horizontal direction and its vertical dimension is defined by the beam spread of the laser beam 120 in the vertical direction. As such, each color pixel includes three subpixels of three different colors (e.g., the red, green and blue). The laser module 110 scans the laser beam 120 one horizontal line at a time, e.g., from left to right and from top to bottom to fill the screen 101. The relative alignment of the laser module 110 and the screen 101 can be monitored and controlled to ensure proper alignment between the laser beam 120 and each pixel position on the screen 101. In one implementation, the laser module 110 can be controlled to be fixed in position relative to the screen 101 so that the scanning of the beam 120 can be controlled in a predetermined manner to ensure proper alignment between the laser beam 120 and each pixel position on the screen 101. In FIG. 2A, the scanning laser beam 120 is directed at the green phosphor stripe within a pixel to produce green light for that pixel.

Figure 2B:
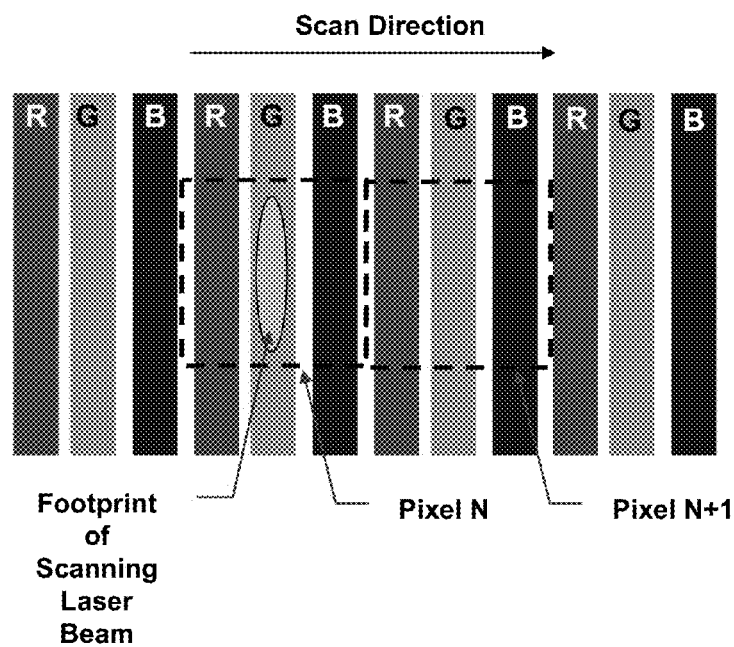

FIG. 2B shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110. A laser source that is used to produce a scanning laser beam that excites a phosphor material on the screen may be a single mode laser or a multimode laser. The laser may also be a single mode along the direction perpendicular to the elongated direction phosphor stripes to have a beam spread that is confined by and is smaller than the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

FIGS. 2A and 2B further show the structure of an image region or image pixel element 210 that outputs light for forming images in the screen example shown. The image pixel region is the region where the image element that defines the composite color and image intensity at that location. In the illustrated example, the dimension of the pixel region is defined by the physical width of the three color stripes in one dimension (e.g., the horizontal direction perpendicular to the color stripes) and the control of the beam spot for a particular image information in the other dimension without a physical boundary of the pixel region (e.g., the vertical direction parallel to the color stripes). In other implementations, both dimensions of the pixel regions may be defined by physical boundaries. Each pixel region 210 includes three subpixel regions 212 which emit light of three different colors, respectively. In each pixel region 210, the respective portions of the three parallel light-emitting stripes are optically active regions that emit visible light and the space between the light-emitting stripes is filled with a non-light-emitting material forming a divider located between the light-emitting stripes.

In the example in FIGS. 1A, 1B, 2A and 2B, two constituent display screens 101 interface each other along a common border 102H or 102V and the parallel light-emitting stripes extend to each edge of the constituent display screen 101 to have a distance between an edge of an edge light-emitting region of one constituent display screen 101 to an edge of an edge light-emitting region of an adjacent constituent display screen 101 at a common border 102H or 102V between the two constituent display screens 101 to be comparable to or less than a dimension of an image pixel shown in FIG. 2B. Depending upon the construction of the display screens and the intended resolution, the common edge may be comparable to or less than the dimension of two image pixels in some designs. Two adjacent constituent display screens 101 are oriented to each other to have parallel light-emitting stripes of one constituent display screen 101 to be parallel to parallel light-emitting stripes of the other constituent display screen 101. This relative orientation provides a continuous appearance of an image displayed at and around a common border 102H or 102V between two adjacent constituent display screens.

The constituent display screens 101 for the composite display screen 100 can be identical in shape and size in some implementations and may have varying shapes and sizes in other implementations. Depending on the shapes of the screens 101, a common border between two adjacent constituent display screens 101 may have various edge to edge orientations and may be either curved or straight.

Figure 3:
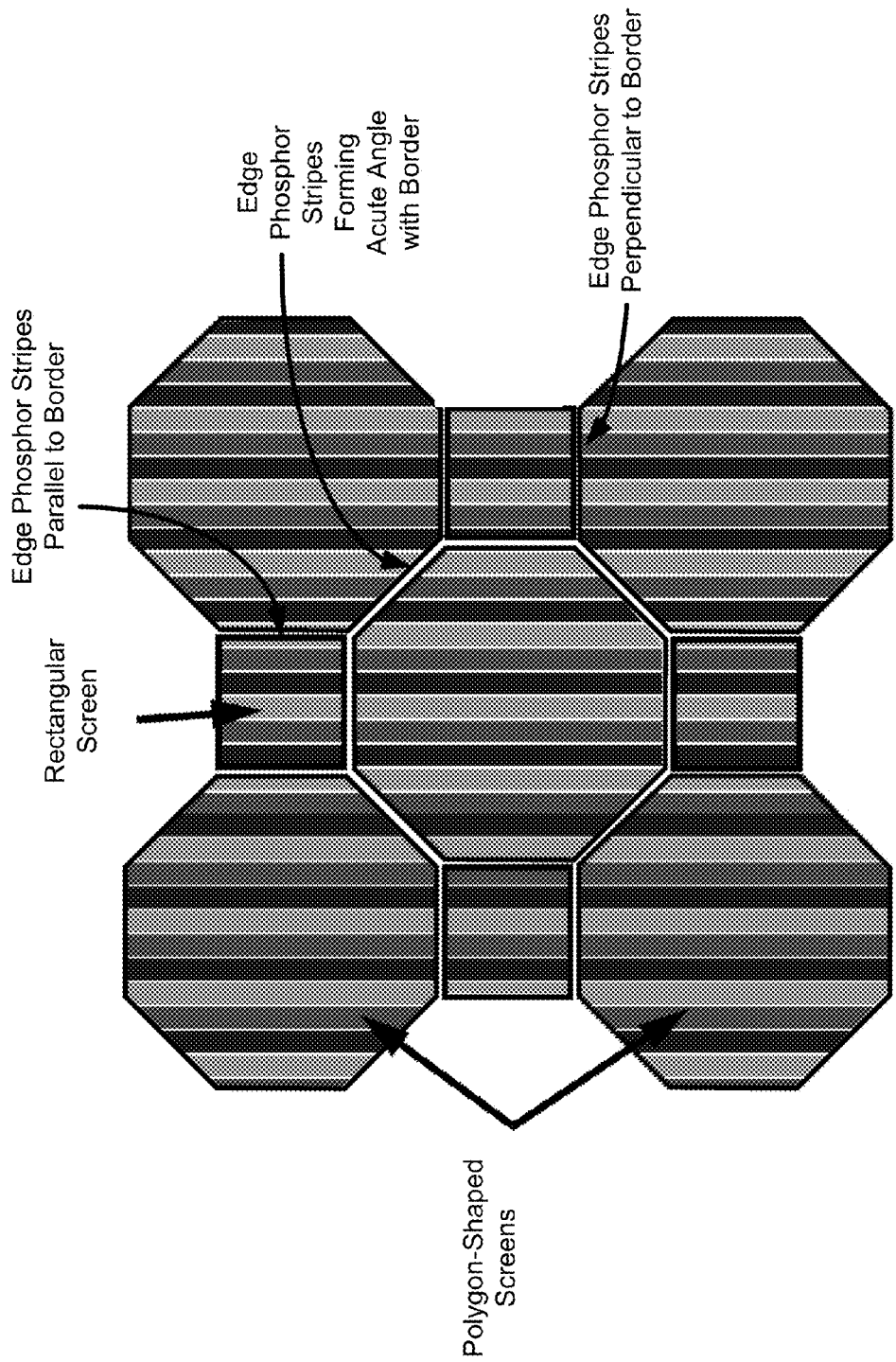
FIG. 3 shows an example of a composite display screen with constituent screens of different shapes and sizes.

FIG. 3 shows an example of a composite display screen that has five polygon-shaped large constituent screens and four rectangular small constituent screens to form a non-rectangular pattern. Hence, the rectangular display screen is an example where two adjacent edges are perpendicular to each other and the polygon shaped screen is an example where two adjacent edges form an angle different from 90 degrees. This example also shows three different orientations of the parallel phosphor stripes at a common border between two adjacent constituent screens: parallel, perpendicular or at an acute angle. When one of the constituent display screens has an edge that is perpendicular to the parallel light-emitting stripes, a light-emitting stripe of a color in the constituent display screen is aligned to a light-emitting stripe of the same color in another adjacent constituent display screen at a common border of the two adjacent constituent display screens at the edge of the constituent display screen. The design of the light-emitting screen 101 shown in FIGS. 1B, 2A and 2B allows the screen 101 to be easily made in various shapes and sizes to generate composite display screens 100 in various shapes and sizes for versatile display applications. Such flexibility, versatility and scalability of the composite screen 100 can be advantageously used in various applications that may be difficult or impractical to implement by using some other display technologies.

For example, based on technical features in FIG. 3 and elsewhere in this document, a composite screen can be formed by placing two or more constituent display screens adjacent to one another to form a contiguous display surface that has spatially uniform pixel regions in each location of the contiguous display surface where a border between two adjacent and interfacing edges of two adjacent constituent display screens is less in width than a dimension of one pixel region. Each constituent display screen includes light-emitting materials that form the pixel regions and emit visible light with a substantial spatial uniformity over a solid angle of greater than 70 degrees to display images with a large wide viewing angle. Each constituent display screen is structured to have a ratio between any two gaps of any of the constituent screens formed with one or more adjacent constituent screens to be less than 1.3. Under this design, a uniform display quality can be achieved in all directions across the composite screen. In one implementation, amongst three adjacent constituent display screens, one edge of a first display screen and an edge of a second constituent display screen may be placed adjacent to and to interface with two distinct edges of a third constituent display screen. In a configuration based on the above implementation, a fourth constituent display screen may be placed adjacent to and to interface with the third constituent display screen at a third edge of the third constituent display screen that is different from the two distinct edges of the third constituent display screen interfacing with the first and the second constituent display screens.

Another aspect of the present designs is that the light-emitting screen 101 is energized to emit visible light 103 for displaying images by the one or more optical beams 120 from the light module 110 that is off the screen 101. Therefore, the light-emitting screen 101 itself does not require circuitry to power the screen 101 for displaying images. This aspect of the light-emitting screen 101 is different from some other screen technologies such as plasma and LCD flat panel screens that often require on-screen circuits to power and operate the screens. Notably, the light-emitting materials on the screen 101 shown in FIGS. 1B, 2A and 2B can be placed at or near the edges of the screen 101 with no or little dead areas at the edges. As described in examples in this document, the screen 101 can include multiple screen layers that are stacked over one another and a thin layer of an adhesive material may be applied on each edge surface to bound the layers together. This thin adhesive layer can be controlled with a thickness less than the dimension of an image pixel to maintain the width of the border between two screens 101 to be comparable to or less than the dimension of the image pixel. As such, when two such screens are tiled against each other, the border between two adjacent screens 101 is imperceptible to the viewer when the screens are operated to show images. The image pixels on the screen 101 and the resultant composite screen 100 are optically addressed by controlling the one or more scanning optical beams 120. Therefore, the screen 101 does not need the pixel addressing circuits typically associated with LCD, plasma and other flat panel displays that are often located on edges of the active screen area as part of the frame or bezel of the screen. In this context, each light-emitting screen 101 is an essentially bezel-free screen and the composite display screen 100 formed by screens 101 have essentially uniform and contiguous spatial distribution of the light-emitting materials over the composite display screen 100, including gaps or borders between adjacent screens 101.

Figure 4:
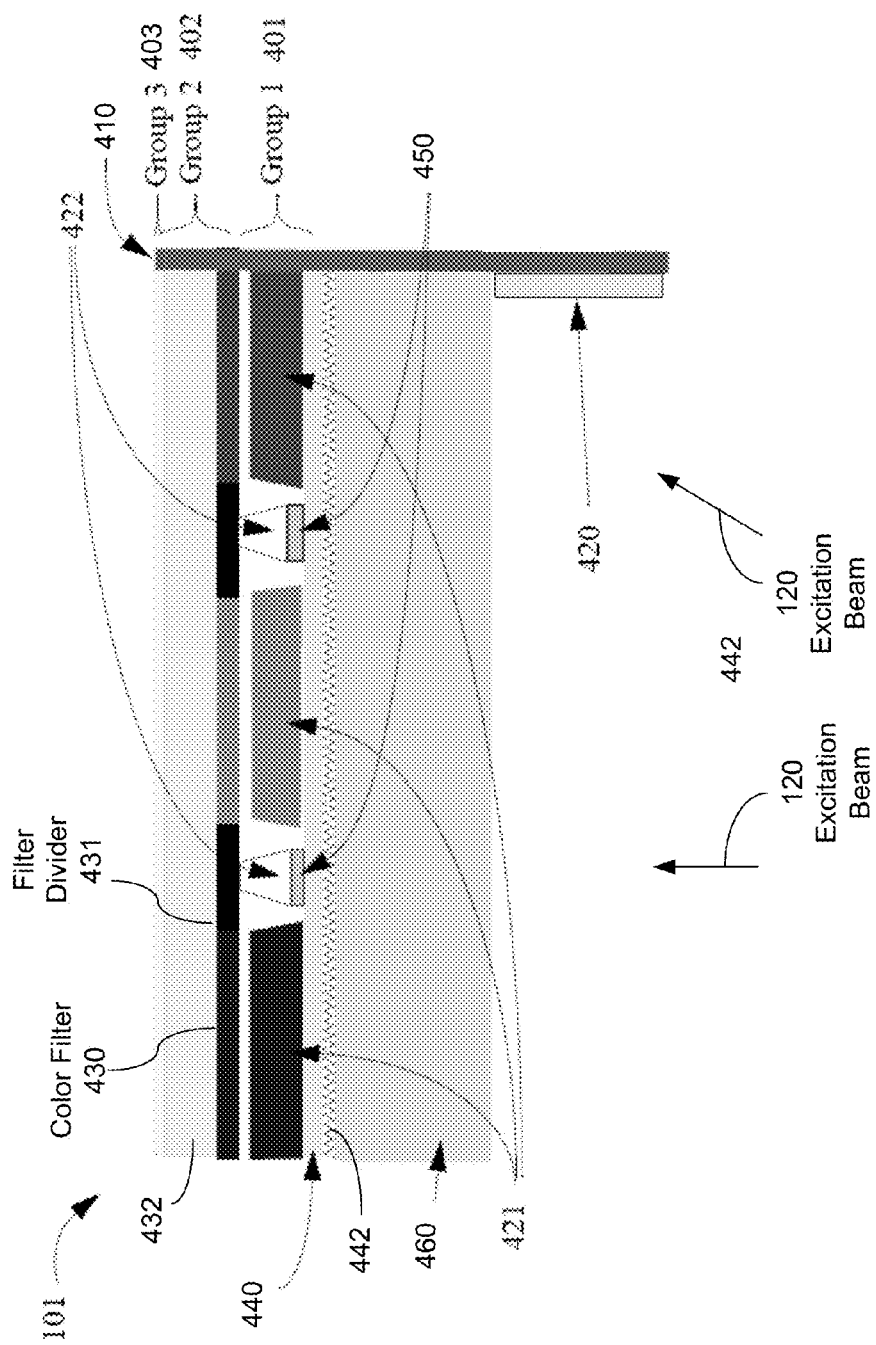
FIG. 4 shows an example of a light-emitting constituent screen for a composite display screen.

FIG. 4 illustrates an example of a constituent screen 101 for the composite screen 100 in FIG. 1 to provide substantially pixel regions with either a substantially uniform inter-pixel spacing or a substantially uniform pixel design throughout the composite screen 100 with a dead area at the edge of each screen 101 to be less than one half of the dimension of an image pixel. The light-emitting materials can be distributed in each screen 101, e.g., parallel stripes as shown in FIGS. 1B, 2A and 2B, to have the total area of the light-emitting materials in the screen 101 to be at least 50% of the total area of the screen 101. In some implementations for high-definition displays, the total area of the light-emitting materials in the screen 101 can be over 80% of the total area of the screen 101 to effectuate high brightness of the displayed images and to provide a smooth imaging experience to a viewer. In some implementations, the spacing between two adjacent light-emitting material stripes on the screen 101 can be selected to control the ratio of the total area of the light-emitting materials in the screen 101 over the total area of the screen 101. For a given width of the light-emitting material stripes, the inter-stripe spacing can be reduced to increase the ratio with a reduced display resolution or increased to reduce the ratio with an increased display resolution.

The screen 101 in FIG. 4 has three laminated screen layers 401, 402 and 403. Each layer can be a single layer or a composite layer with two or more sublayers. The layer 401 is the light-emitting phosphor layer that has color emissive phosphor stripes 421 that are excitable by UV laser light 120 and three adjacent color emissive phosphor stripes 431 are formed of three different phosphor compositions to emit three different colors such as light in red, green and blue colors. Phosphor stripe dividers 422 are provided between two adjacent phosphor stripes 421. The screen layer 402 next to the layer 401 is a color filter layer having color filters 430 that transmit light of their respective designated colors while absorbing light in other colors. The color filters 430 are separated by filter dividers 430 (e.g., conductive chromium lines) which may be black and are matched in position and color to the phosphor stripes 421 in the phosphor layer 401. For a red phosphor stripe 421 that emits red light, the matching color filter 430 in the filter layer 402 is made of a material that transmits in a red band covering the red light emitted by the red phosphor stripe and absorbs or otherwise blocks other visible light including the green and blue light. Similarly, for a green phosphor stripe 421 that emits green light, the matching filter 430 in the filter layer 402 is made of a material that transmits in a green band covering the green light emitted by the green phosphor stripe 421 and absorbs or otherwise blocks other visible light including the red and blue light. For a blue phosphor stripe 421 that emits blue light, the matching color filter 430 in the filter layer 402 is made of a material that transmits in a blue band covering the blue light emitted by the blue phosphor and absorbs or otherwise blocks other visible light including the green and red light. The filter layer 402 can include a transparent layer 432 that is made of a glass or other transparent material. The filter layer 402 operates to enhance the contrast of the display. On top of the filter layer 402 is a UV blocking layer 403 that blocks residual UV light that transmits through the phosphor layer 401 to protect the viewer from eye damage. The UV blocking layer 403 can be an acrylic layer or directly deposited as a thin film on the filter layer 402. In the illustrated example, the UV blocking layer 403 is in contact with the transparent layer 432.

An edge layer 410 is formed on each side edge of the layers 401-403 of the screen 101 in FIG. 4 and is a screen component that inhibits light emanation from being flush against the screen's edge. The edge layer 410 can be made to have a thickness less than the dimension of a pixel of the screen 101, e.g., one half of the dimension of the pixel. Therefore, the apparent emitted light to a viewer appears to be at the screen edge and, when interfaced with another screen 101, the border of the two screens has a width less than the dimension of the pixel and thus is imperceptible to the viewer when the two screens are operated to show images. For example, the edge layer 410 may have a thickness of 100 um. The edge layer 410 can be made of an adhesive that holds layers of the screen 101 together by adhesion.

On the side of the light-emitting phosphor layer 401 that receives the excitation beam 120, a support transparent layer 440 (e.g., a glass layer) is provided to adhere to the phosphor layer 401. Pressure sensitive adhesive stripes 450 are formed on one side of the phosphor layer 401 on the end surfaces of the phosphor stripe dividers 422 and are in contact with the support transparent layer 440 to engage the phosphor layer 401 to the layer 440. The support transparent layer 440 includes a Fresnel lens that receives the excitation beam 120 and directs the received excitation beam 120 into the phosphor layer 401 at or near a normal incidence. A transparent substrate 460 (e.g., a glass substrate) is attached to the support transparent layer 440 and receives the excitation light 120 for energizing the phosphor layer 401.

The screen 101 can include a panel frame 420 that are engaged to the glass substrate 460 to provide mechanical support for the screen 101. The panel frame 420 is located within the outer edge of the glass substrate 460 and lies within the boundary of the screen 101, thereby keeping the screen 101 the widest portion of the display module. The panel frame 420 is attached to the laser module 110 to maintain a fixed position between the screen 101 and the laser module 110. In addition, panel frames 420 of the screens 101 are engaged to one another to hold the screens 101 in a desired tiled pattern forming the composite screen 100. The edge layer 410 formed on each side edge of the layers 401-403 of the screen 101 extends to the side surfaces of the support transparent layer 440, the glass substrate 460 and the panel frame 420 to hold all screen layers together.

Figure 5:
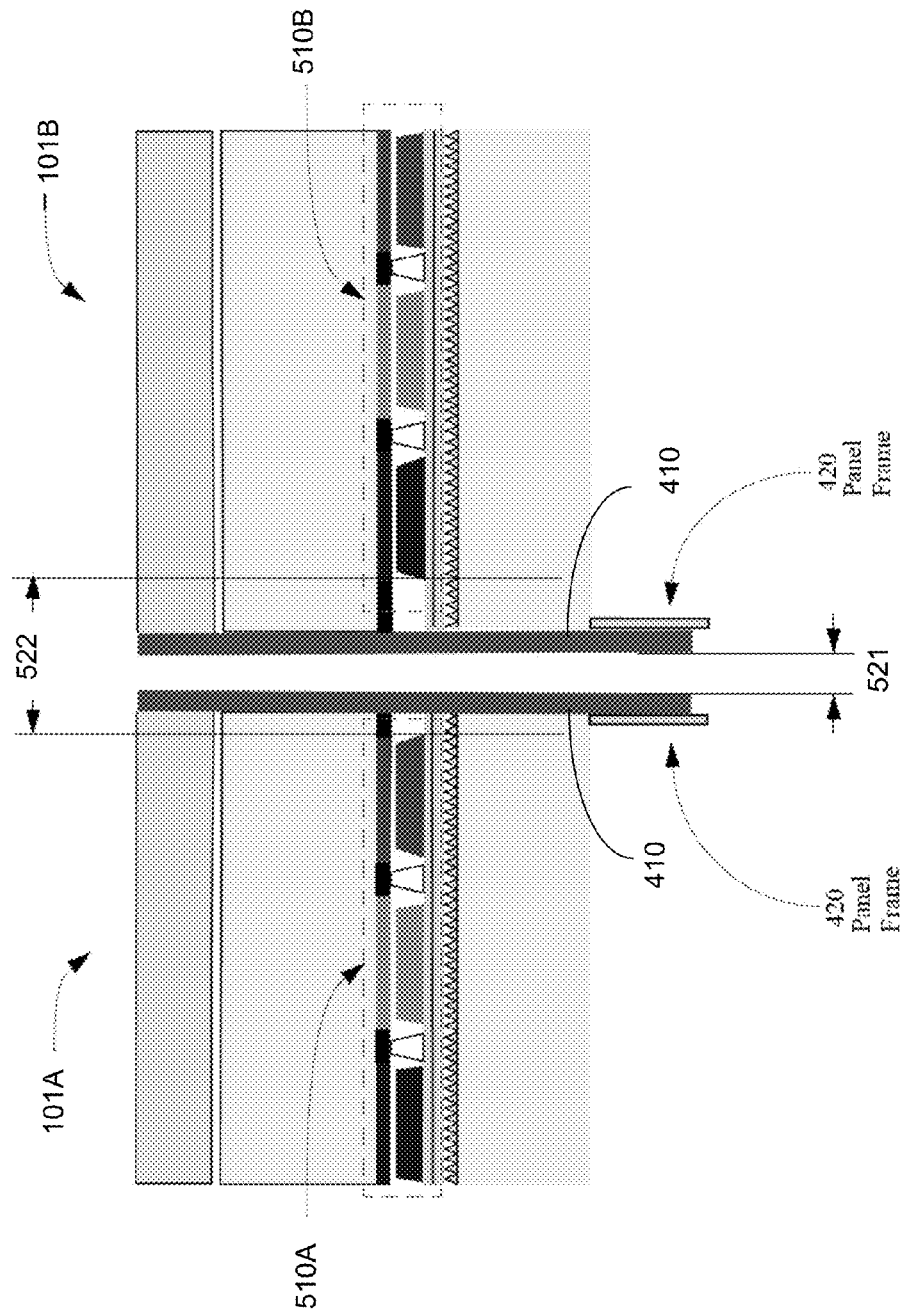
FIGS. 5 and 6 show examples of arrangements of light-emitting constituent screens to form composite display screens.

FIG. 5 shows that two screens 101A and 101B based on the screen design in FIG. 4 are placed together in a composite screen. The screen edge pixel 510A of the screen 101A and its counterpart 510B in the screen 101B are in proximity to each other so the pixel pitch among pixels within a single constituent screen 101A or 101B remains unchanged for the composite screen. The screen to screen gap 521 between the outer edges of the screens 101A and 101B is set to make the edge pixel to edge pixel gap 522 to be within the dimension of one pixel in each edge of the screens.

Figure 6:
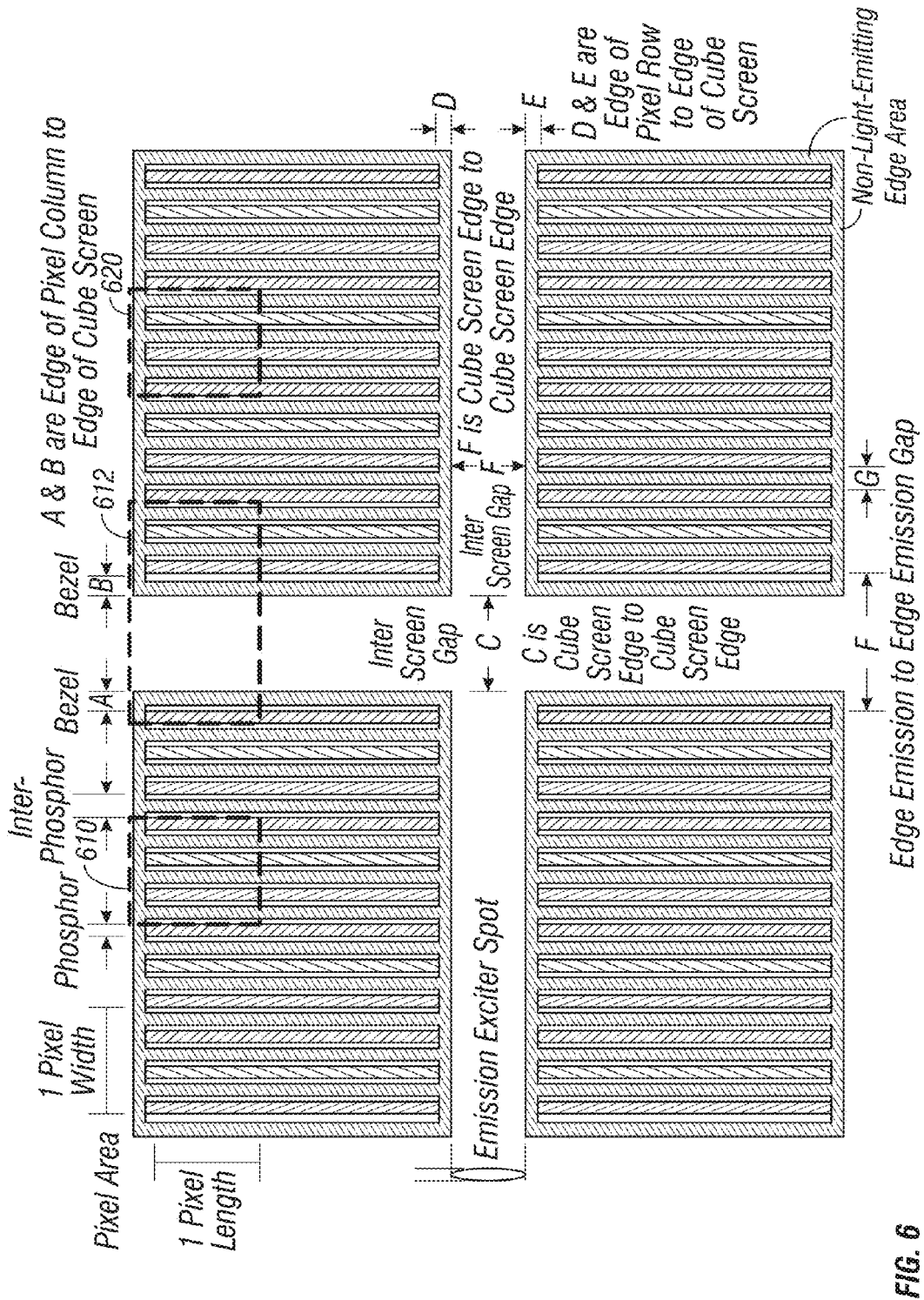

FIG. 6 shows an example of a portion of a composite screen illustrating the relative positions of four adjacent constituent screens showing non-light-emitting edge areas on four sides of each constituent screen. In this example with parallel light-emitting material stripes where three adjacent light-emitting stripes emit three different colors, a width of the pixel along the direction perpendicular to the stripes is the total width of three adjacent light-emitting stripes and their inter-strips gaps or dividers. The pixel width along the direction of the parallel light-emitting stripes is optically defined by the width of the optical beam that excites the screen. This optical beam has an elongated shape with a dimension of the pixel width about the pixel width along the direction of the parallel light-emitting strips and a dimension of about one third of the pixel width along the direction perpendicular to the parallel light-emitting stripes. The bezels A and B of the two adjacent screens may have the same or different dimensions while the total of the bezels A and B and the inter-screen gap C, (A+B+C), which is the edge to edge gaps between one edge light-emitting strip in one screen and another edge light-emitting stripe in a different color in another screen, is set to be about the same as the gap labeled as G between the two light-emitting stripes in the same screen to achieve a substantially spatially uniform pixels within each screen and across the border of two adjacent screens. As illustrated, three pixels 610, 620 and 612 are shown in the top two adjacent constituent screens in FIG. 6 and all have the substantially the same horizontal and vertical dimensions. The pixels 610 and 620 are pixels within the top two constituent screens while the pixel 612 has light-emitting stripes in both the top two constituent screens and includes the bezels A, B and the gap C. The placement of the phosphor defining pixel can be placed substantially at the edge of the screen at each side of the screen and the one or more excitation beams are directed into the light-emitting phosphor layer from the back surface of the screen without occupying any edge area of the screen. Such a screen design enables a ratio of between any two gaps of any of the constituent screens formed with one or more adjacent constituent screens to be less than 1.3. As an example, referring to FIG. 1, the ratios between any 102H and 102V for any screens 101 are less than 1.3. For another example, referring to FIG. 3, the polygon constituent screen located in the center has gaps with multiple rectangular screens and polygon screens and a ratio of any two of such gaps is less than 1.3. In FIG. 6, the gaps labeled F and C have a ratio of less than 1.3. Hence, the gap between constituent screens is set by the gap between edge pixels on the adjacent screens and remains approximately the same whether the screens are positioned top to bottom or side to side. This design of keeping the ratio between any two edge to edge screen pair gaps to be less than 1.3 can maintain a uniform display quality in all directions across the composite screen.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this document.

What is claimed is:

1. A display device, comprising:
a composite display screen comprising a plurality of constituent display screens positioned next to one another where two adjacent constituent display screens interface each other along a common border, each constituent display screen including an active image-display area that includes parallel light-emitting stripes which absorb light of the one or more scanning optical beams to emit visible light to produce images carried by the one or more scanning optical beams and extend substantially to each edge of the constituent display screen to have a distance between an edge of an edge light-emitting region of one constituent display screen to an edge of an edge light-emitting region of an adjacent constituent display screen at a border between the two constituent display screens to be comparable to or less than a dimension of an image pixel, the plurality of constituent display screens each including a panel frame, wherein panel frames of adjacent constituent display screens are configured to engage one another; and
an edge layer disposed on each side edge of the constituent display screen, the edge layer being configured to inhibit light emanation from being flush against the side edge,
wherein the two adjacent constituent display screens are oriented to each other to have parallel light-emitting stripes of one constituent display screen to be parallel to parallel light-emitting stripes of the other constituent display screen.

2. The device as in claim 1, wherein:
in each constituent display screen, the parallel light-emitting stripes extend to each edge of the constituent display screen so that a distance between an edge of the parallel light-emitting stripes and a closest edge of the constituent display screen is less than one half of a total width of three adjacent parallel light-emitting stripes.

3. The device as in claim 1, wherein:
each constituent display screen has a ratio between a total light emitting area to a total area of each constituent display screen greater than 50%.

4. The device as in claim 1, wherein:
two adjacent parallel light-emitting stripes emit light of two different colors, and
one of the constituent display screens has an edge that is perpendicular to the parallel light-emitting stripes and a light-emitting stripe of a color in the constituent display screen is aligned to a light-emitting stripe of the same color in another adjacent constituent display screen at a common border of the two adjacent constituent display screens at the edge of the constituent display screen.

5. The device as in claim 1, wherein:
one of the constituent display screens has an edge that is at an angle with respect to the parallel light-emitting stripes and a light-emitting stripe of a color in the constituent display screen is aligned to a light-emitting stripe of the same color in another adjacent constituent display screen at a common border of the two adjacent constituent display screens at the edge of the constituent display screen.

6. The device as in claim 1, wherein:
one of the constituent display screens has a shape with two adjacent edges being perpendicular to each other.

7. The device as in claim 6, wherein:
one of the constituent display screens has a shape with two adjacent edges forming an angle different from 90 degrees.

8. The device as in claim 1, wherein:
two of the constituent display screens that are adjacent to each other have two different shapes.

9. The device as in claim 1, wherein:
each constituent display screen has an emission angle with respect to a surface of the screen that is uniform along two different directions on the surface of the screen.

10. The device as in claim 1, wherein:
the constituent display screens are structured to make an edge of an active image-display area of one screen at a border with another adjacent screen to be spaced from a closest edge of an active image-display area of the other adjacent screen at the border to be less than a total width of four adjacent parallel light-emitting stripes.

11. The device as in claim 1, comprising:
a plurality of scanning beam modules that are located relative to the composite display screen with one scanning beam module being designated to produce the one or more scanning optical beams to a designated constituent display screen and different scanning beam modules being designated to produce the one or more scanning optical beams to different constituent display screens, respectively.

12. The device as in claim 1, wherein the panel frame is positioned within a boundary of the corresponding constituent display screen.

13. A display device, comprising:
a composite screen including two or more constituent display screens placed adjacent to one another to form a composite display surface having substantially spatially uniform pixel regions in each location of the composite display surface where a border between two adjacent and interfacing edges of two adjacent constituent display screens is less in width than a dimension of one pixel region, each constituent display screen comprising light-emitting materials that form the pixel regions and emit visible light with a substantial spatial uniformity over a solid angle of greater than 70 degrees to display images, and structured to have a ratio between any two gaps of any of the constituent screens formed with one or more adjacent constituent screens to be less than 1.3, the plurality of constituent display screens each including a panel frame, wherein panel frames of adjacent constituent display screens are configured to engage one another; and
an edge layer disposed on each side edge of the constituent display screen, the edge layer being configured to inhibit light emanation from being flush against the side edge.

14. The device as in claim 13, wherein:
wherein a total of light-emitting area within each pixel region within each constituent display screen is over 50% of an area of each pixel region.

15. The device as in claim 13, wherein:
each constituent display screen is structured to have a pixel region that is substantially at an edge of the constituent display screen to have a distance between the edge of the constituent display screen and an edge of the pixel region towards the edge of the constituent display screen to be less than one half of a dimension of each pixel region.

16. The device as in claim 15, wherein:
an edge of a pixel region of a constituent display screen that is at an edge of the constituent display screen and the edge of the constituent display screen coincide without a spacing therebetween.

17. The device as in claim 13, wherein:
two adjacent constituent display screens have different shapes.

18. The device as in claim 13, wherein:
the light-emitting materials are parallel light-emitting stripes and three adjacent parallel light-emitting stripes emit visible light at three different colors, respectively, and each pixel region includes three adjacent parallel light-emitting stripes.

19. The device as in claim 13, wherein:
one of the constituent display screens has a curved edge.

20. The device as in claim 13, wherein:
amongst three adjacent constituent display screens, one edge of a first display screen of the three adjacent constituent display screens and an edge of a second constituent display screen of the three adjacent constituent display screens are placed adjacent to and to interface with two distinct edges of a third constituent display screen of the three adjacent constituent display screens.

21. The device as in claim 20, wherein:
a fourth constituent display screen is placed adjacent to and to interface with the third constituent display screen at a third edge of the third constituent display screen that is different from the two distinct edges of the third constituent display screen interfacing with the first and the second constituent display screens.

22. The device as in claim 13, wherein the panel frame is positioned within a boundary of the corresponding constituent display screen.

23. A display device, comprising:
constituent display screens placed adjacent to one another to form a substantially contiguous display surface of substantially spatially uniform light-emitting pixels including a border between two adjacent constituent display screens when each constituent display screen is energized by excitation energy to display images, each constituent display screen comprising a front screen layer, a back screen layer and a light-emitting layer of light-emitting materials, located between the front and back screen layers, that receive the excitation energy through the back screen layer to emit visible light through the front screen layer forming the displayed images, wherein the light-emitting materials emit the visible light with a substantial spatial uniformity over a solid angle of greater than 70 degrees, the plurality of constituent display screens each including a panel frame, wherein panel frames of adjacent constituent display screens are configured to engage one another;
an edge layer disposed on each side edge of the constituent display screen, the edge layer being configured to inhibit light emanation from being flush against the side edge; and
a mechanism that applies the excitation energy to penetrate through the back screen layer without passing through any peripheral area around the constituent display screen.

24. The device as in claim 23, wherein:
the excitation energy is optical energy and the mechanism that applies the excitation energy to penetrate through the back screen layer includes an optical module that generates one or more excitation beams for carrying the excitation energy.

25. The device as in claim 23, wherein the panel frame is positioned within a boundary of the corresponding constituent display screen.

* * * * *

UNITED STATES PATENT AND TRADEMARK OFFICE
CERTIFICATE OF CORRECTION

PATENT NO. : 8,493,284 B2  Page 1 of 1
APPLICATION NO. : 12/425357
DATED : July 23, 2013
INVENTOR(S) : Roger A. Hajjar It is certified that error appears in the above-identified patent and that said Letters Patent is hereby corrected as shown below:

In the Claims

1.) Column 13, Claim 14, Line 51: before "a total" delete "wherein".

Signed and Sealed this
Twenty-eighth Day of January, 2014

Michelle K. Lee
*Deputy Director of the United States Patent and Trademark Office*